United States Patent
Brix et al.

(10) Patent No.: US 10,578,212 B2
(45) Date of Patent: Mar. 3, 2020

(54) HYDROSTATIC TRACTION DRIVE AND VEHICLE WITH SUCH A HYDROSTATIC TRACTION DRIVE

(71) Applicant: Robert Bosch GmbH, Stuttgart (DE)

(72) Inventors: Norman Brix, Leipheim (DE); Steffen Mutschler, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 158 days.

(21) Appl. No.: 15/478,412

(22) Filed: Apr. 4, 2017

(65) Prior Publication Data
US 2017/0292604 A1 Oct. 12, 2017

(30) Foreign Application Priority Data
Apr. 8, 2016 (DE) ........................ 10 2016 205 891

(51) Int. Cl.
| | |
|---|---|
| *F16H 61/46* | (2010.01) |
| *F16H 61/435* | (2010.01) |
| *F16H 39/02* | (2006.01) |
| *F16H 61/425* | (2010.01) |

(52) U.S. Cl.
CPC .............. *F16H 61/46* (2013.01); *F16H 39/02* (2013.01); *F16H 61/435* (2013.01); *F16H 61/425* (2013.01)

(58) Field of Classification Search
CPC ......... F16H 61/46; F16H 61/435; F16H 39/02
USPC .......................................................... 60/490
See application file for complete search history.

(56) References Cited

U.S. PATENT DOCUMENTS

| | | | | |
|---|---|---|---|---|
| 5,865,602 A | * | 2/1999 | Nozari ................... | F04B 1/324 417/212 |
| 5,881,629 A | * | 3/1999 | Gollner ................. | F04B 49/002 417/218 |
| 6,050,090 A | * | 4/2000 | Tohji ..................... | E02F 9/2203 60/421 |
| 7,690,471 B2 | * | 4/2010 | Hanamoto ........... | F16H 61/456 180/282 |

(Continued)

FOREIGN PATENT DOCUMENTS

DE    10 2010 052 065 A1    5/2012

OTHER PUBLICATIONS

Parikh (CAN Protocol—Understanding the Controller Area Network Protocol, posted on EngineersGarage.com prior to Feb. 3, 2013 date of first comment. retrieved Dec. 3, 2018).*

*Primary Examiner* — Nathaniel E Wiehe
*Assistant Examiner* — Richard C Drake
(74) *Attorney, Agent, or Firm* — Maginot, Moore & Beck LLP

(57) ABSTRACT

A hydrostatic traction drive for a vehicle with a hydrostat includes a hydraulic pump, a hydraulic motor, and an electronic control unit. The hydraulic pump has an adjustable stroke volume, and includes an adjustment device configured to adjust the adjustable stroke volume. The hydraulic motor is arranged with the hydraulic pump in a hydraulic circuit, in particular a closed hydraulic circuit. The electronic control unit is configured to exclusively control the hydrostat so that the traction drive is controllable without knowledge or control of specific components thereof. The electronic control unit has a defined interface configured to pass a target value for an operating parameter of the hydrostat to the electronic control unit.

10 Claims, 2 Drawing Sheets

(56) References Cited

U.S. PATENT DOCUMENTS

| | | | | |
|---|---|---|---|---|
| 7,987,941 B2* | 8/2011 | Shirao | B60W 10/06 | 180/307 |
| 8,316,983 B2* | 11/2012 | Shirao | B60W 10/06 | 180/305 |
| 8,380,407 B2* | 2/2013 | Mutschler | E02F 9/2235 | 701/58 |
| 8,386,136 B2* | 2/2013 | Shirao | B60W 10/06 | 701/50 |
| 8,607,919 B2* | 12/2013 | Shirao | F04B 9/02 | 180/307 |
| 8,646,263 B2* | 2/2014 | Shirao | F16H 61/421 | 60/327 |
| 8,683,794 B2* | 4/2014 | Fukuda | F16H 61/4008 | 60/431 |
| 9,656,656 B2* | 5/2017 | Xing | B60W 10/06 | |
| 2007/0068152 A1* | 3/2007 | Nishi | F16H 61/423 | 60/490 |
| 2008/0295507 A1* | 12/2008 | Mueller | B60K 6/12 | 60/414 |
| 2010/0212309 A1* | 8/2010 | Dyck | F16H 39/08 | 60/490 |
| 2012/0266595 A1* | 10/2012 | Buschur | F02B 37/10 | 60/607 |
| 2014/0311463 A1* | 10/2014 | Hayashi | F02B 39/08 | 123/561 |
| 2015/0176252 A1* | 6/2015 | Kim | E02F 9/22 | 701/50 |
| 2016/0047399 A1* | 2/2016 | Kim | F15B 11/02 | 60/327 |
| 2016/0153533 A1* | 6/2016 | Czepak | F16H 61/423 | 60/327 |
| 2017/0314673 A1* | 11/2017 | Lenzgeiger | B60K 17/10 | |

* cited by examiner

HYDROSTATIC TRACTION DRIVE AND VEHICLE WITH SUCH A HYDROSTATIC TRACTION DRIVE

This application claims priority under 35 U.S.C. § 119 to patent application no. DE 10 2016 205 891.6, filed on Apr. 8, 2016 in Germany, the disclosure of which is incorporated herein by reference in its entirety.

The disclosure concerns a hydrostatic traction drive for a vehicle with a hydrostat comprising a hydraulic pump that can be adjusted in the stroke volume thereof by an adjustment device and a hydraulic motor that is disposed in a preferably closed hydraulic circuit with the hydraulic pump and with an electronic control unit. The disclosure also concerns a vehicle with such a hydrostatic traction drive.

BACKGROUND

One such hydrostatic traction drive is known for example from DE 10 2010 052 065 A1.

Hydrostats are typically controlled by a control signal for the hydraulic pump that is adjustable regarding the displacement volume thereof or the stroke volume thereof and a control signal for a hydraulic motor that is optionally variable regarding the displacement volume thereof or the volumetric displacement thereof. The control signals can be electric currents that are proportionately converted into a control pressure to which the displacement devices of the hydraulic pump and hydraulic motor are subjected, or are converted into a displacement volume.

The electric currents are manipulated in an electronic control unit depending on the operating state in order for example to prevent an overload of a diesel engine driving the hydraulic pump that is detected by means of the difference between the actual revolution rate thereof and the target revolution rate thereof.

A further known example is the ramp that is driven over during reversing, i.e. a change in direction, by means of which the electric current to the hydraulic pump and thereby the dynamics are varied and that is a function of the position of the accelerator pedal. Operating parameters of the vehicle, such as for example the revolution rate of the diesel engine and the position of the accelerator pedal, are thereby strongly related to the control of the hydrostats.

It has previously been proposed to control the hydrostats by means of a current demand that is to be fulfilled by the hydraulic motor. An overload of the diesel engine is prevented by reducing the target torque. The reversing dynamics are implemented by scaling the target torque depending on the accelerator pedal. The hydrostat control is solely focused on implementing the torque demand on the hydraulic motor.

SUMMARY

A hydrostatic traction drive should be able to be controlled electronically without accurate knowledge of the components thereof and the specific control thereof.

For this purpose, according to the disclosure a vehicle with a hydrostatic traction drive and a vehicle control unit and a hydrostatic traction drive are specified, wherein the hydrostatic traction drive comprises a hydrostat, which comprises a hydraulic pump that can be adjusted in the stroke volume thereof by an adjustment device, and a hydraulic motor, that is disposed with the hydraulic pump in a preferably closed hydraulic circuit, and an electronic control unit and various electronic regulators, for example a torque regulator for the hydraulic motor, a revolution rate regulator for the hydraulic motor and a power regulator for the hydraulic pump, and is characterized in that the electronic control unit alone controls the hydrostat and has a defined interface and that a target value for an operating parameter of the hydrostat is passed to the electronic control unit via the defined interface.

Via the defined interface, which is for example defined by means of a CAN protocol, the electronic control unit can communicate with a vehicle control unit of a vehicle. The vehicle control unit analyzes all interfaces, such as for example human machine interfaces or temperature signals on the vehicle, and controls the behavior of the vehicle by influencing for example the diesel engine, the working hydraulics, the fan, the lighting, the air conditioning system or a target value for the traction drive. The electronic control unit of the hydrostatic traction drive, referred to below as the first control unit, controls only the hydrostatic gearbox.

The vehicle control unit can for example specify a torque demand, a speed demand, a power demand or a combination of said variables via the interface. It is thereby possible to cleanly separate the vehicle function from the hydrostat control. An interface is provided that enables the manufacturer of the vehicle to control any gearbox with a vehicle control unit and thereby to build up a portfolio oriented to market requirements in a simple manner.

A hydrostatic traction drive including an electronic control units is thus provided by the disclosure that is controlled via a defined interface using target vehicle values such as traction force or speed corresponding to torque and revolution rate or pump power corresponding to the diesel engine load. The interface, which for example is implemented using the CAN protocol, enables integration within an existing vehicle structure that comprises an electronic vehicle control unit. The behavior of the vehicle is defined using target values solely by means of the vehicle control unit. During the adjustment of the behavior of the vehicle, the physics of hydrostatics no longer have to be taken into account.

The hydraulic pump and the hydraulic motor can be operated in a closed or open hydraulic circuit.

A plurality of hydraulic pumps or a plurality of hydraulic motors is possible, wherein a hydraulic pump supplies a plurality of hydraulic motors with pressure medium, or a plurality of hydraulic pumps supplies a hydraulic motor with pressure medium, or a first hydraulic pump or first hydraulic pumps and a first hydraulic motor or first hydraulic motors are disposed in a first hydraulic circuit and a second hydraulic pump or second hydraulic pumps and a second hydraulic motor or second hydraulic motors are disposed in a second hydraulic circuit. The hydrostatic traction drive can thus also comprise a plurality of hydrostats.

In addition, a manual gearbox that is combined with a hydrostat can also be considered.

The first control unit calculates the electric currents for the adjustment devices of the hydraulic pump and of the hydraulic motor that are necessary to achieve the target value on the basis of a target value for torque, revolution rate or power.

In general, it is possible to simultaneously specify different target values for different hydraulic motors. If there are for example a hydraulic pump and four variable wheel hub motors for a total of four wheels of a vehicle, then a different target torque can be specified for each hydraulic motor. Alternatively, a target revolution rate can be specified for the hydraulic motors of a first axle and a target torque can be specified for the hydraulic motors of a second axle.

The target values are provided by the vehicle control unit via an electronic interface, for example a CAN protocol.

The communications between the first control unit and the vehicle control unit are advantageously bidirectional. The first control unit communicates to the vehicle control unit operating limits and current data of the hydrostat, such as for example maximum possible torque, maximum possible revolution rate, maximum possible power, current temperature and current revolution rate. Further variables are conceivable.

The first control unit and the vehicle control unit can be virtual control units that run on common hardware.

As possible application areas of the disclosure, only wheel loaders and forestry machines are explicitly mentioned here.

BRIEF DESCRIPTION OF THE DRAWINGS

An exemplary embodiment of a vehicle according to the disclosure is represented in the drawings. Using the figures of said drawings, the disclosure is now described in detail.

In the figures

DETAILED DESCRIPTION

Figure 1:
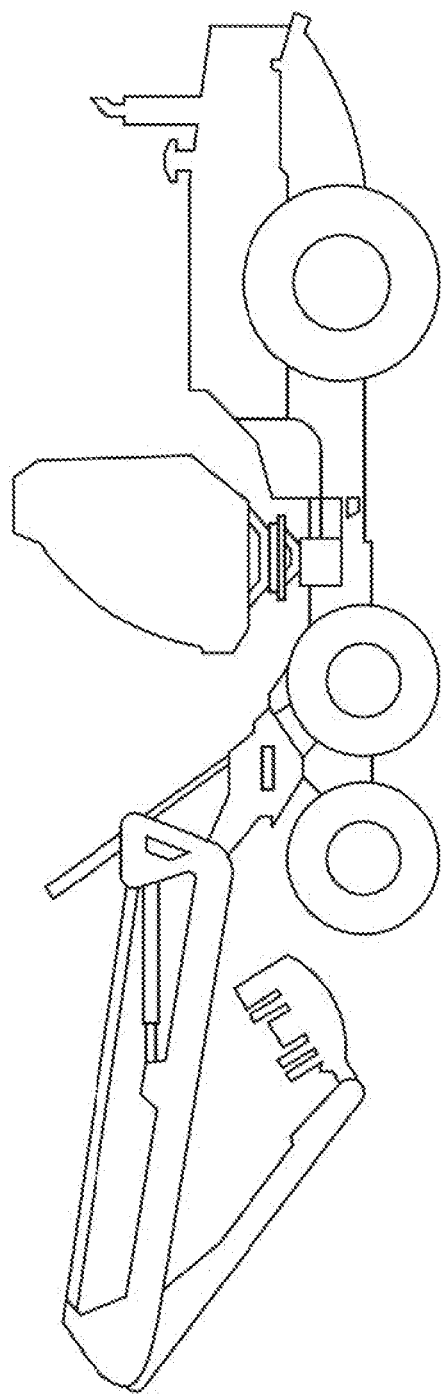
FIG. 1 shows a harvester for the forest.
Figure 2:
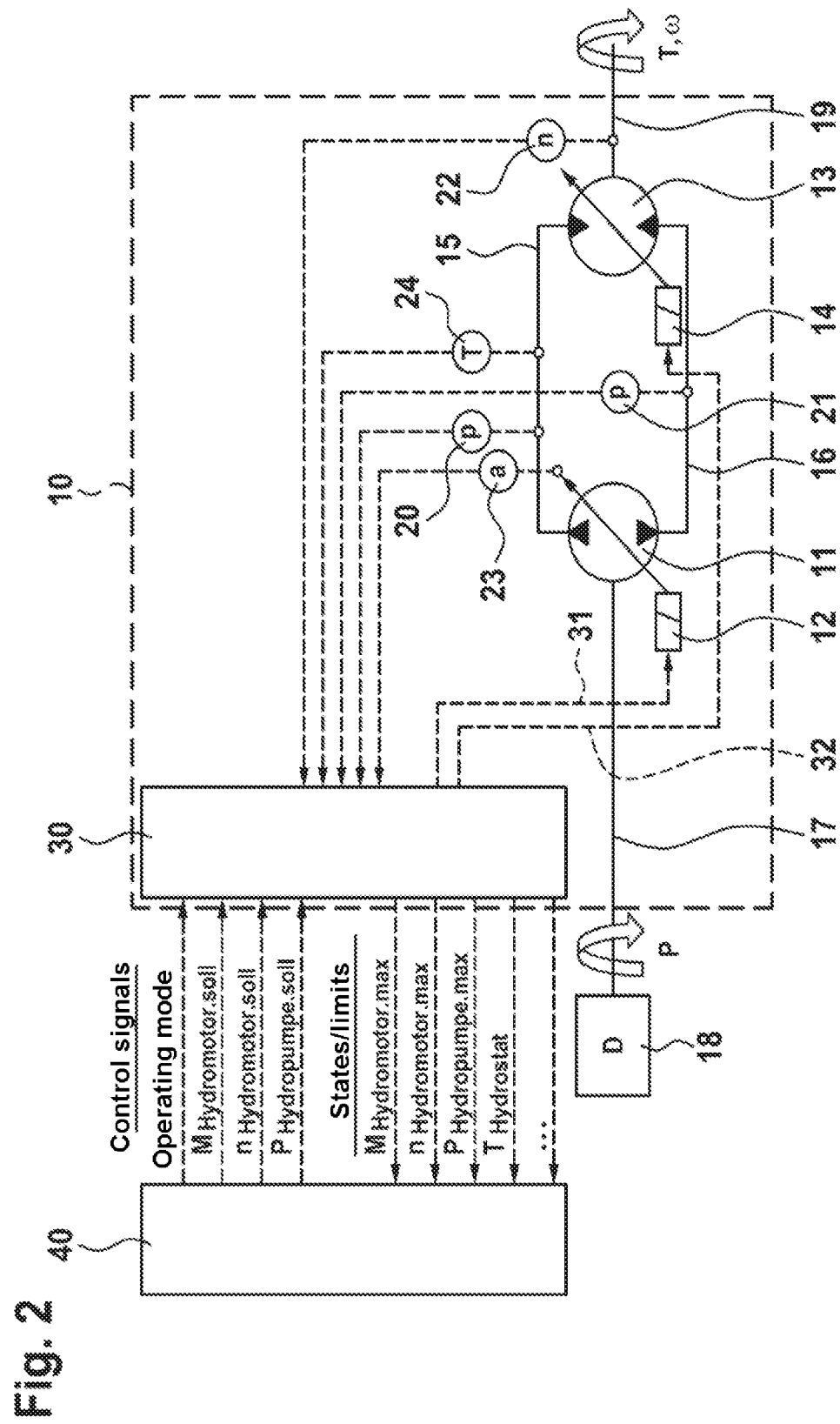
FIG. 2 shows the hydrostatic traction drive and the vehicle control unit of the harvester of FIG. 1.

The timber harvester according to FIG. 1 comprises a hydrostatic traction drive 10 with a hydraulic pump 11 that is adjustable in the displacement volume thereof and that comprises an adjustment device 12, and with a hydraulic motor 13 that is also adjustable in the displacement volume thereof and that comprises an adjustment device 14. The hydraulic pump 11 and the hydraulic motor 13 are fluidically connected to each other in a closed hydraulic circuit via two working lines 15 and 16. The hydraulic pump is adjustable in two opposite directions from a neutral position in which the displacement volume is zero, so that the direction of travel of the vehicle can be changed just by adjusting the hydraulic pump past zero. Usually, the hydraulic pump and the hydraulic motor are axial piston machines. The hydraulic pump 11 can be driven by a diesel engine 18 by means of a shaft 17. The hydraulic motor 13 drives an output shaft 19 that is mechanically connected to two wheels of the timber harvester in a manner that is not shown in detail.

The pressure in the working line 15 is detected with a pressure sensor 20. The pressure in the working line 16 is detected with a pressure sensor 21. The revolution rate of the output shaft 19 is detected with a revolution rate sensor 22. The displacement volume of the hydraulic pump 11 is detected with a swivel angle sensor 23.

Finally, there is a temperature sensor 24 connected to the working line 15, with which the temperature of the hydraulic oil is detected. The sensors 20 to 24 convert the detected variables into electrical signals.

The hydrostatic traction drive 10 includes furthermore an electronic control unit 30 to which the variables detected by the sensors 20 to 24 are delivered as electrical signals. The electronic control unit 30 is only designed for controlling the hydrostat, the essential components of which are the hydraulic pump 11 and the hydraulic motor 13. For the purposes of said control, the control unit 30 is connected via an electrical line 31 to the adjustment device 12 of the hydraulic pump 11 and via an electrical line 32 to the adjustment device 14 of the hydraulic motor 13. The adjustment device 12 of the hydraulic pump 11 can for example comprise two pressure regulating valves and a control piston that is adjoined by two control chambers that are subjected to different control pressures via the two pressure regulating valves.

The adjustment device of the hydraulic motor 13 can for example be a so-called EP adjuster, with which a swivel angle of the axial piston machine is adjusted in proportion to the magnitude of an electric current to which an electromagnet of a regulating valve is subjected, wherein the swivel angle, converted using a compression spring, is fed back as a force acting on the regulating valve against the force of the electromagnet.

The timber harvester according to FIG. 1 comprises an electronic vehicle control unit 40 that analyzes all the interfaces on the vehicle, such as for example the human machine interfaces or the temperature signals, and controls the behavior of the vehicle by influencing the diesel engine, the working hydraulics, the fan, the lighting, the air conditioning system or a target value for the traction drive. The control unit 30 of the hydrostatic traction drive has a defined interface, via which it communicates bidirectionally with the electronic vehicle control unit 40. The vehicle control unit 40 notifies the control unit of the operating mode in which the hydrostatic traction drive is to be operated and the target values that are necessary for this.

A target torque $M_{Hydromotor,soll}$ that is to be output by the hydraulic motor is notified if the vehicle is to be driven according to a torque demand to be applied to the output shaft 19. For example, the target torque can be positive for an acceleration or negative for a braking process. The torque applied by the hydraulic motor 13 results from the product of the instantaneous volumetric displacement and the pressure difference across the hydraulic motor 13 that can be determined using the signals of the two pressure sensors 20 and 21. The instantaneous volumetric displacement can be determined in the present case using the signals of the revolution rate sensor 22, because the volumetric displacement of the hydraulic motor is adjusted by the EP adjuster depending on the revolution rate of the output shaft 19 and the value of the actual volumetric displacement is detected depending on the current flowing through the electromagnet of the EP regulating valve.

A target revolution rate $n_{Hydromotor,soll}$ for the hydraulic motor is communicated if the vehicle is to be driven at a speed determined by the revolution rate of the output shaft 19. The revolution rate of the hydraulic motor 13 results from the output of the hydraulic pump 11 and the volumetric displacement of the hydraulic motor 13. The electronic control unit can now act, while taking into account the signal of the revolution rate sensor 22, so that at low revolution rates the hydraulic motor 13 is adjusted to the maximum volumetric displacement thereof and the target revolution rate of the output shaft 19 is achieved by suitably adjusting the hydraulic pump. For revolution rates higher than a revolution rate at which the hydraulic pump is at full displacement, the hydraulic motor 13 is adjusted to volumetric displacements that are smaller than the maximum volumetric displacement thereof.

For both of the above operating modes, in addition a power limit $P_{Hydropumpe,soll}$ for the hydraulic pump 11 can be output by the vehicle control unit 40 to the control unit 30. This type of pump regulation that is generally referred to as power regulation of the hydraulic pump is actually a torque regulation with more accurate consideration, wherein the maximum torque that can be demanded of the hydraulic pump results from the pressure difference across the hydraulic pump that can be determined using the signals of the two pressure sensors 20 and 21 and the current displacement volume of the hydraulic pump 11 that can be determined using the signals of the swivel angle sensor 23. However, during the determination of the maximum torque for the hydraulic pump, the vehicle control unit 40 can take into account the revolution rate of the shaft 17 that is known because of the revolution rate of the diesel engine, so that true power regulation is achieved.

As already mentioned, the communications between the control unit 30 and the vehicle control unit 40 are bidirectional. The control unit 30 communicates to the vehicle control unit 40 operating limits such as $M_{Hydromotor,max}$, $n_{Hydromotor,max}$ and $P_{Hydropumpe,max}$ and current values of different parameters such as for example $T_{Hydrostat}$, which are taken into account by the vehicle control unit 40 during the specification of the target values.

LIST OF REFERENCE SIGNS 10 hydrostatic traction drive
11 hydraulic pump
12 adjustment device for 11
13 hydraulic motor
14 adjustment device for 13
15 working line
16 working line
17 drive shaft
18 diesel engine
19 output shaft
20 pressure sensor
21 pressure sensor
22 revolution rate sensor
23 swivel angle sensor
24 temperature sensor
30 electronic control unit
31 electrical line
32 electrical line
40 electronic vehicle control unit

What is claimed is:

1. A hydrostatic traction drive for a vehicle, the hydrostatic traction drive comprising:
a hydrostat comprising:
a hydraulic pump that includes an adjustment device configured to adjust a stroke volume of the hydraulic pump; and
a hydraulic motor that is arranged with the hydraulic pump in a hydraulic circuit; and
an electronic control unit configured to control only the hydrostat, and including a CAN protocol interface configured to receive a first target value for a first operating parameter of the hydrostat from a vehicle control unit of the vehicle, the electronic control unit configured operate the adjustment device of the hydrostat based on the first target value,
wherein the first operating parameter is one of an output torque demand of the hydraulic motor, an output speed demand of the hydraulic motor, and a power demand of the hydraulic pump.

2. The hydrostatic traction drive of claim 1, wherein the hydraulic motor includes a further adjustment device configured to adjust a hydraulic displacement of the hydraulic motor, and the electronic control unit is further configured to operate the further adjustment device based on the first target value.

3. The hydrostatic traction drive of claim 1, wherein the first operating parameter is one of the output torque demand and the output speed demand.

4. The hydrostatic traction drive of claim 1, wherein the electronic control unit is further configured to output operating limits of the hydraulic pump and hydraulic motor, and current state parameters of the hydrostat via the CAN protocol interface.

5. The hydrostatic traction drive of claim 1, the hydrostat further comprising at least one of:
at least one further hydraulic pump; and
at least one further hydraulic motor.

6. The hydrostatic traction drive of claim 4, the hydrostat further comprising:
a further hydraulic motor;
wherein the CAN protocol interface is configured to receive a second target value for the further hydraulic motor, the first and second target values being different values of the first operating parameter.

7. The hydrostatic traction drive of claim 4, the hydrostat further comprising:
a further hydraulic motor;
wherein the CAN protocol interface is configured to receive a second target value for a second operating parameter of the further hydraulic motor, the second operating parameter being different from the first operating parameter.

8. A vehicle, comprising:
a hydrostatic traction drive that includes:
a hydrostat comprising:
a hydraulic pump that includes an adjustment device configured to adjust a stroke volume of the hydraulic pump;
a hydraulic motor that is arranged with the hydraulic pump in a hydraulic circuit; and
an electronic control unit configured to control only the hydrostat, and including a CAN protocol interface configured to receive a first target value for a first operating parameter of the hydrostat, the electronic control unit configured operate the adjustment device of the hydrostat based on the first target value; and
an electronic vehicle control unit configured to specify a behavior for the vehicle, and to communicate with the CAN protocol of the electronic control unit and to transmit the first target value of the first operating parameter to the CAN protocol,
wherein the first operating parameter is one of an output torque demand of the hydraulic motor, an output speed demand of the hydraulic motor, and a power demand of the hydraulic pump.

9. The hydrostatic traction drive of claim 1, wherein the hydraulic circuit is a closed circuit.

10. The vehicle of claim 8, wherein the electronic vehicle control unit is configured to determine the first target value without consideration of physics of the hydrostat.

* * * * *